United States Patent [19]

Derrico

[11] Patent Number: 4,681,250

[45] Date of Patent: Jul. 21, 1987

[54] VAPOR PHASE PROCESSING MACHINE

[75] Inventor: Gerard G. Derrico, Maynard, Mass.

[73] Assignee: Dynapert-HTC Corporation, Concord, Mass.

[21] Appl. No.: 891,932

[22] Filed: Jul. 30, 1986

[51] Int. Cl.[4] .......................... H05K 3/34; B23K 1/08
[52] U.S. Cl. .................... 228/37; 228/180.1
[58] Field of Search ..................... 228/33, 35, 36, 37, 228/39, 180.1, 180.2, 219, 220; 118/410, 411, 412; 425/140, 145, 148

[56] References Cited

U.S. PATENT DOCUMENTS

| | | | |
|---|---|---|---|
| 3,398,873 | 8/1968 | Wegener et al. | 228/37 |
| 3,724,418 | 4/1973 | McLain | 228/37 |
| 4,474,322 | 10/1984 | Aldous | 228/180.1 |
| 4,538,757 | 9/1985 | Bertiger | 228/37 |

Primary Examiner—M. Jordan
Attorney, Agent, or Firm—Spencer T. Smith

[57] ABSTRACT

A machine for soldering a work product. Work product is conveyed through the machine and an applicator directs an extended liquid stream against the conveyed work product. The applicator is rotatable about a horizontal axis and a rotatable manifold assembly delivers liquid to the applicator and the manifold assembly is rotatable about an axis parallel to the axis of the applicator means and is rotated by a bell crank which is supported for rotation about the axis of the manifold assembly and a link member which is pivotally connected between the bell crank and the applicator with the points of interconnection defining with the axes of rotation of the applicator and the manifold assembly a parallelogram so that rotation of the bell crank will rotate the applicator means.

4 Claims, 6 Drawing Figures

VAPOR PHASE PROCESSING MACHINE

In a vapor phase processing system, an electronic liquid which is contained within a tank is heated by heaters located within the contained fluid to generate a zone of saturated vapor. Work product is delivered by a conveyor to the saturated vapor zone for processing. Where the work product is presented at a substantially horizontal orientation and includes through-hole devices, molten solder may be directed upwardly against the bottom surface of the work product by a suitable laminar flow solder applicator which is located below the work product. The saturated vapor will maintain the solder in a molten state so that a leveling nozzle can remove excess solder from the work product.

The direction of this stream of molten solder should be adjustable.

It is an object of the present invention to provide a laminar flow solder applicator having a flow direction which can be selectively varied to maximize the effectiveness of the applicator. The applicator can be completely drained by dumping the contents of the applicator into the tank.

Other objects and advantages of the present invention will become apparent from the following portion of this specification and from the following drawings which illustrate in accordance with the mandate of the patent statutes a presently preferred embodiment incorporating the principles of the invention.

Referring to the drawings.

Figure 1:
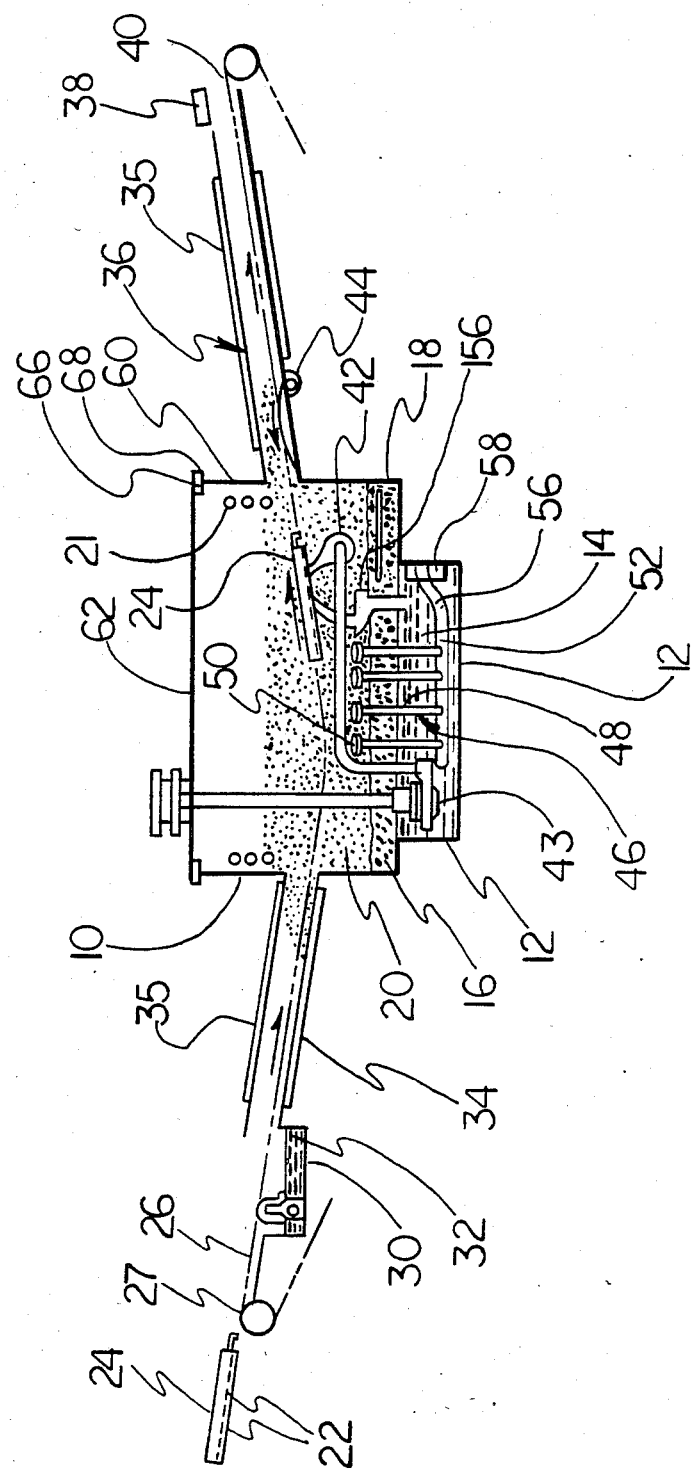
FIG. 1 is a schematic drawing of a vapor phase processing machine made in accordance with the teachings of the present invention.

The disclosed vapor phase processing system includes a tank 10 which has a sump 12 for containing solder 14. Electronic liquid 16 which is contained by the tank 10 and floats on the solder 14, is heated by immersion heaters 18 located within the electronic liquid to generate a zone 20 of saturated vapor. The height of this zone 20 is controlled by cooling coils 21. Work product (here boards 22 mounted on a carrier 24) is loaded onto a conveyor 26 at a load position 27. The conveyor carries the work product over a foam fluxer 30 which applies flux 32 to the bottom surface of the boards 22, through the downwardly inclined inlet throat 34 which is cooled by conventional cooling structure 35 and into the saturated vapor zone 20 for processing. The processed boards 22 are then carried through the upwardly inclined cooled 35 exit throat 36 past cooling fans 38 to the product off-load location 40.

Molten solder 14 is applied to the fluxed bottom surface of the boards 22 by a laminar flow solder applicator 42 which is supplied by a suitable pump 43 and excess solder is removed by a leveling or debridging nozzle 44 which directs streams of electronic liquid 16 against the soldered surface of the boards 22. The solder 14 will be maintained at the temperature of the electronic liquid 16 as a result of heat transfer across the electronic liquid/solder interface. To enhance heat transfer to and from the solder, a heat transfer candle assembly 46 is utilized. This assembly includes a plurality of hollow vertical candles 48 that are suitably capped by slightly oversized caps 50 to prevent the entry of anything but vapor. These candles 48 communicate with a manifold 52 which includes an exhaust portion 56 and a mounting flange 58.

A pump (not shown) communicates with the candle assembly manifold 52 thereby drawing hot saturated vapor from the saturated vapor zone 20 within the tank 10 into the candles 48 and through the manifold 52. Heat transfer to the solder accordingly takes place.

Figure 2:
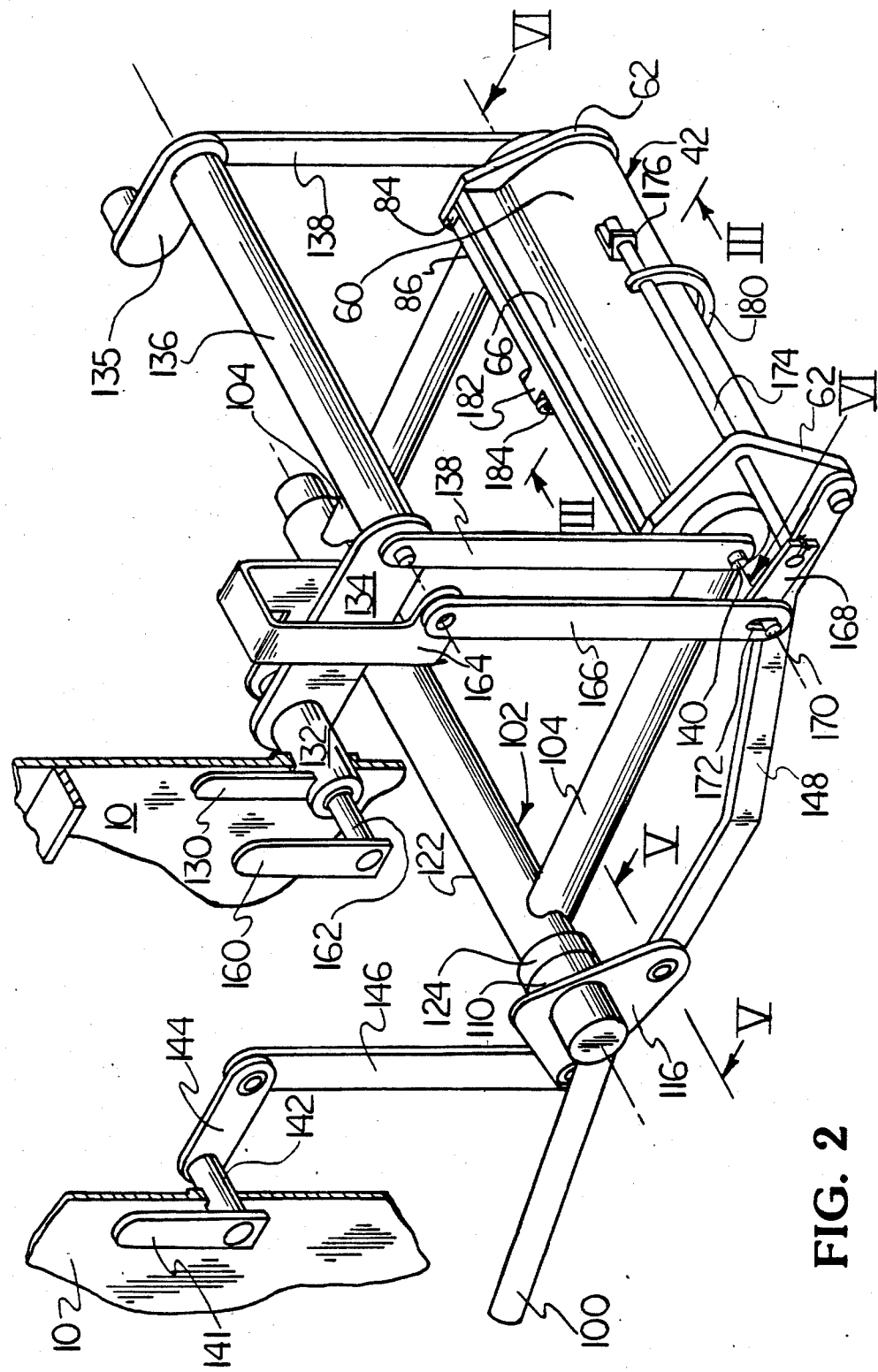
FIG. 2 is an oblique view of the solder applicator illustrated in FIG. 1 and the linkages for controlling its use.
Figure 3:
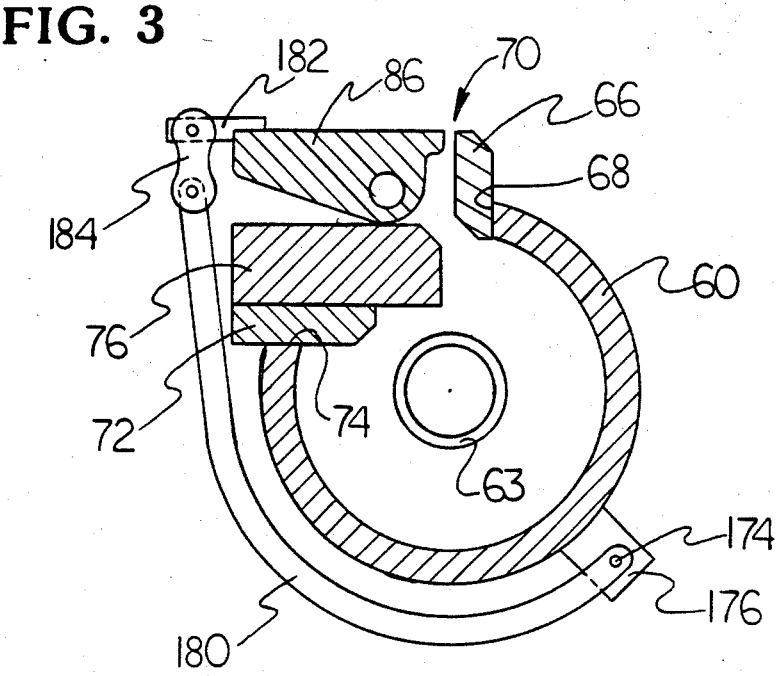
FIG. 3 is a cross-sectional view of the solder applicator taken at lines 3—3 of FIG. 2.
Figure 4:
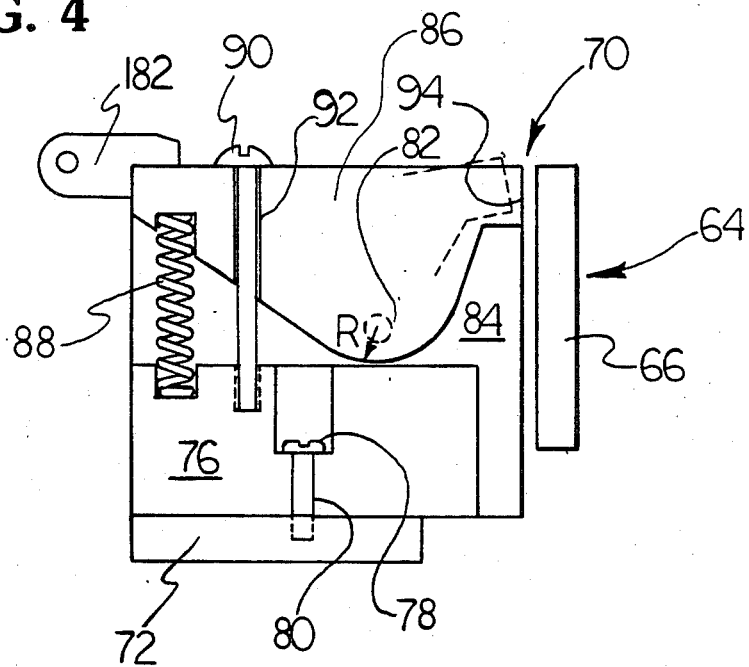
FIG. 4 is an enlarged view of a portion of the nozzle shown in FIG. 3 illustrating the details thereof.

The solder applicator 42 (FIGS. 2-4) has a long nozzle supply tube or barrel 60 which is located between a pair of end caps 62 and which is open along its length. A centrally located sparger tube 63 effects a uniform supply of molten solder across the nozzle barrel 60. A first elongated nozzle plate 66 which is secured to one edge 68 of the nozzle barrel opening is the fixed surface of the extended nozzle orifice 70. A second nozzle plate 72 is secured to the other edge 74 of the opening and a nozzle base 76 is secured to it by suitable fasteners 78 (FIG. 4). These fasteners 78 extend through enlarged bracket holes 80 thereby permitting selected movement of the nozzle base 76 towards and away from the first nozzle plate 66.

Pivotally mounted on pins 82 (one shown) which are supported by nozzle assembly end plates 84 is the nozzle 86. (The nozzle base 76 is also secured to the end plates 84.) The nozzle 86 is maintained at its operating position by compression springs 88 which are compressively located between the nozzle 86 and the nozzle base 76 and which locate the top surface of the nozzle against stop screws 90. The stop screws pass through enlarged holes 92 in the nozzle 86 and are threaded into the nozzle base 76. Parallelism (or a slight obliqueness) between the orifice surface 94 and the permanent nozzle plate 66 can be established by adjusting the stop screws 90 and the spacing between these surfaces can be controlled by moving the nozzle base 76 towards or away from the permanent nozzle plate 66. The lower surface of the nozzle 86 has a constant radius portion R so that a continuous seal will be maintained between the nozzle and the nozzle base 76 as the nozzle is pivotally displaced about the pins 82.

Figure 5:
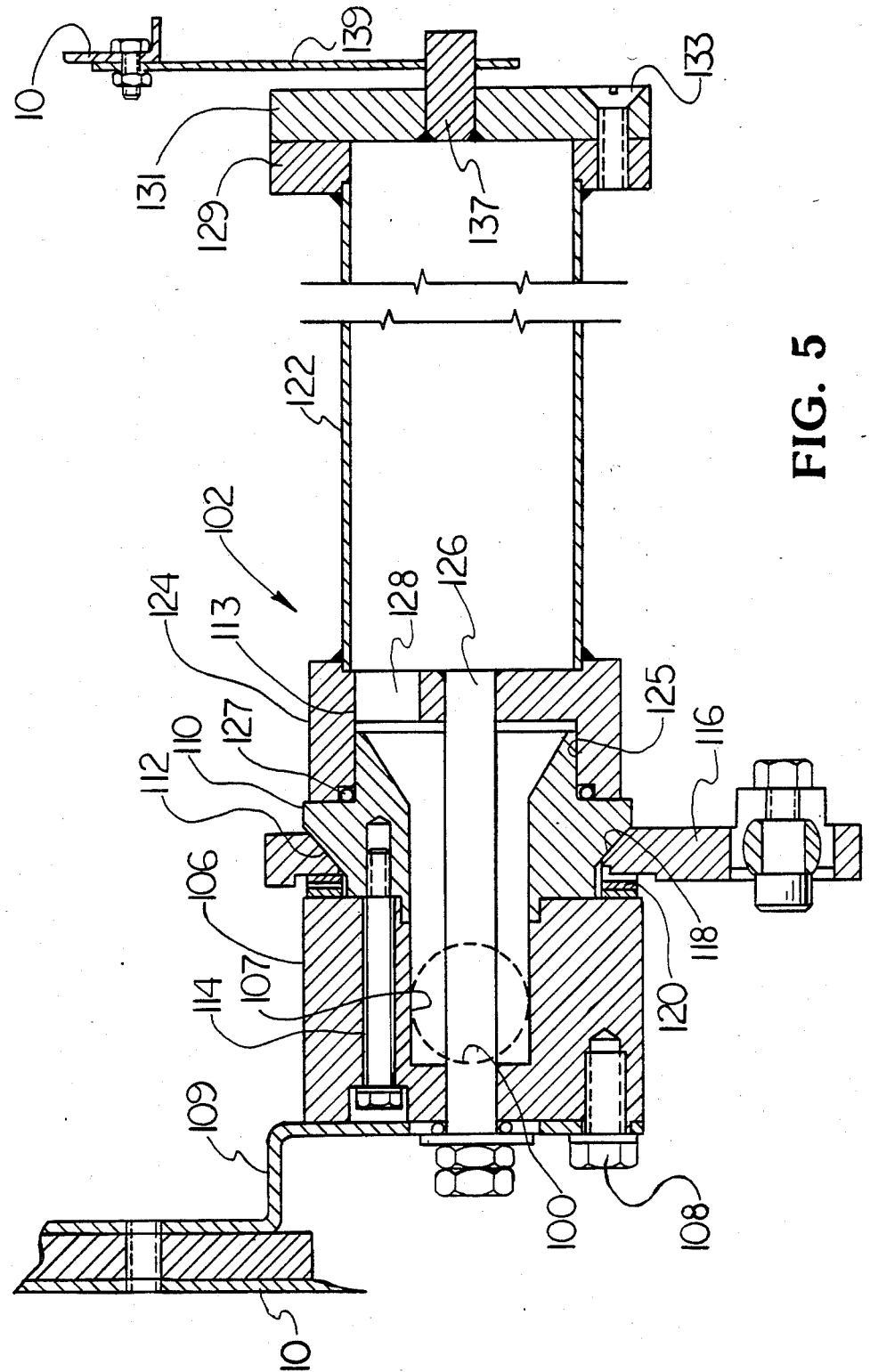
FIG. 5 is a view taken at lines 5—5 of FIG. 2.

Molten solder is delivered via an inlet conduit 100 to a manifold assembly 102 which delivers the solder via feed conduits 104 to the solder applicator 42. The manifold assembly 102 (FIG. 5) has an end coupling 106 having an internal bore 107 which communicates with the inlet conduit 100. The coupling 106 is secured by fasteners 108 to a bracket 109 attached to the tank 10 wall and a hollow bearing member 110 having inclined 112 and cylindrical 113 bearing surfaces is secured to the coupling by other fasteners 114. A bell crank 116 having an annular inclined bearing surface 118 is located between the coupling member 106 and the bearing member 110 and is forcefully urged into mating engagement with the inclined bearing surface 112 by means of a wave spring 120. The manifold assembly 102 has a central tubular portion 122 and an integral end coupling member 124 which has an inner bearing surface 125 rotatably journalled on the cylindrical bearing surface 113 of the bearing member 110. A threaded stud 126 welded to end coupling member 124 holds the manifold assembly together and sealing is achieved with a suitable "O" ring 127. A hole 128 in the diametral portion of the end coupling 124 establishes a permanent fluid path from the hollow bearing member 110 to the central tubular portion 122. The central tubular portion is welded to a flange 129. An end plate 131 is secured by screws 133 (one shown) to this flange 129 and concentrically supports a rod 137 which is pivotally supported by a bracket 139 welded to the tank wall 10.

Figure 6:
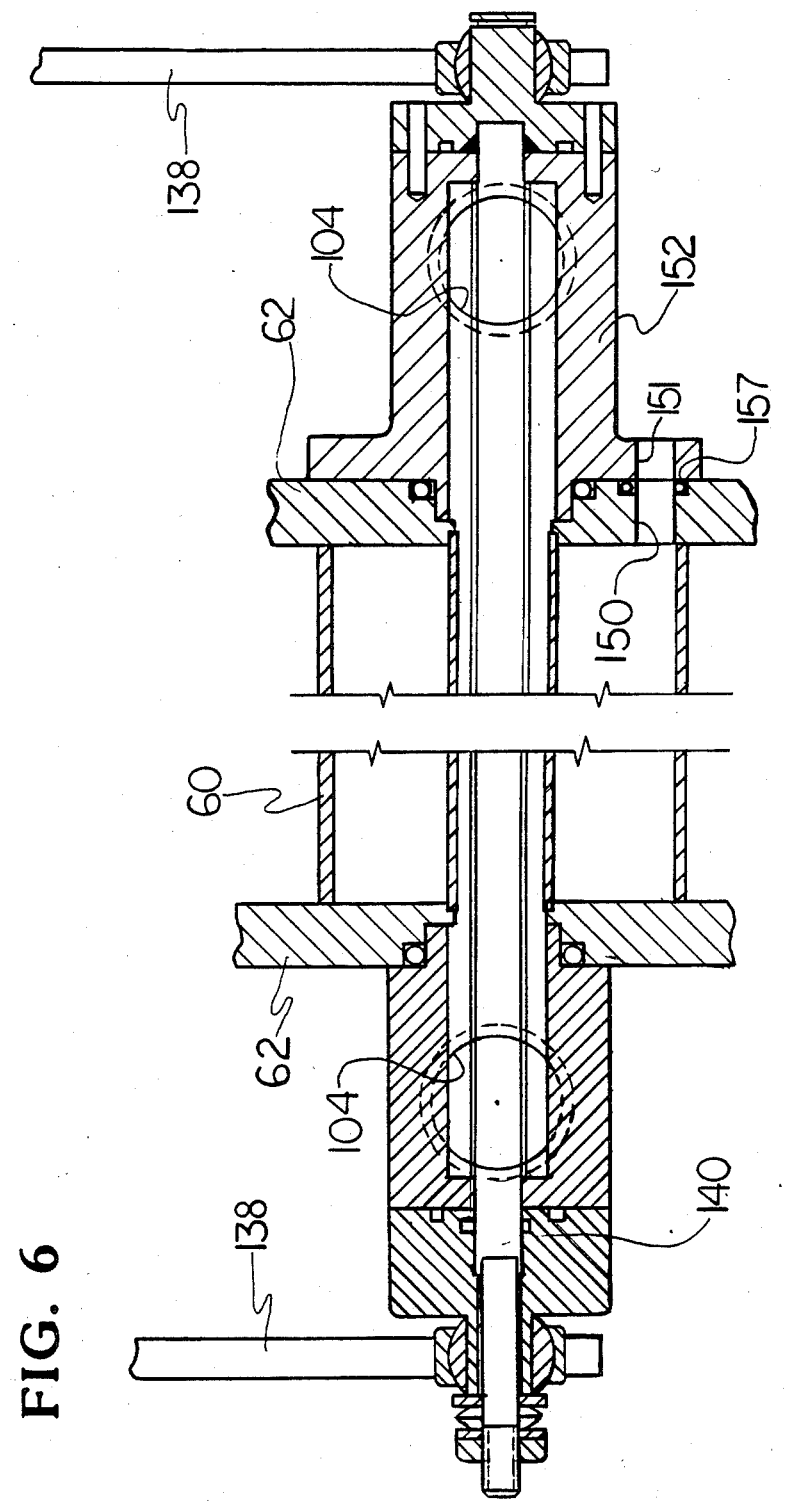
FIG. 6 is a view taken at lines 6—6 of FIG. 2.

The solder applicator can be controlled during operation in four ways. It can be raised or lowered. It can be rotated about its axis to change the direction of the solder stream. It can be rotated to a drain position. And the nozzle opening can be increased to free debris that may be caught in the elongated orifice. To elevate or lower the solder applicator 42, the handle 130 of the nozzle raising linkage is rotated. Rotation of the handle 130 rotates the integral control shaft 132 which is journalled in the tank wall 10 and rotates the control arm 134 which is secured to the control shaft. (This control arm 134 and a second spaced control arm 135 which is rotatable about a common axis, have their free ends tied together by a tie bar 136 so that they will move in unison). Raising links 138 are pivotally connected between the free ends of the control arms 134, 135 and the opposing ends of the solder applicator 42. (As can be seen from FIG. 6, the raising links 138 rotatably support the through shaft 140 which holds the solder applicator together.) Rotation of the control lever 130 accordingly raises or lowers the solder applicator.

The orientation of the solder applicator 42 can also be varied by a solder applicator angle adjusting linkage 30 which also includes a handle 141 for rotating a control shaft 142 journalled in the tank wall 10 and a control arm 144 which is fixedly secured to the control shaft. A first link 146 extends between the free end of the control arm 144 and one corner of the bell crank 116 and a second link 148 extends between the other corner of the bell crank and a solder applicator nozzle end plate 62. The axes of the manifold assembly 102 and the solder applicator 42 and the points of interconnection of the second link 148 define a parallelogram so that rotation of the handle 141 will rotate the solder applicator 42 about its axis with no change in its location. This parallelogram also serves to maintain a constant nozzle angle with respect to the product when the handle 130 is rotated to raise or lower the nozzle. Counterclockwise rotation of this handle 141 to an extreme position (115° from normal to the work product which is beyond the normal operating range of from 0° to 90°) will orient the right hand nozzle end cap 62 at the position illustrated in FIG. 6 where a hole 150 in the end cap communicates with a hole 151 in the flange of the end coupling 152. When so oriented, the molten contents of the solder applicator can be drained. At other angular orientations an "O" ring 157 defines a seal between the nozzle end cap and the flange of the end coupling 152 to effectively close this hole 150.

From time to time, debris will lodge in the nozzle orifice 70 causing a discontinuity in the extended solder stream. When this occurs, the nozzle orifice can be enlarged to free this debris thereby cleansing the nozzle. The nozzle cleaning linkage includes a handle 160 which is secured to a control shaft 162. This shaft 162 is concentrically journalled within a through bore in the raising linkage control shaft 132. A crossover link 164 is secured at one end to the control shaft 162 and is pivotally connected at its other end to a vertical link 166. A lever 168 and the vertical link 166 are connected via a lever pin 170 which is received in an enlarged link aperture 172. In the neutral position illustrated in FIG. 2, the pin axis and the axis of rotation of the solder applicator are coaxial so that changing the orientation of the solder applicator will not effect the lever pin 170.

The control shaft 162 for the cleaning linkage is frictionally held in position relative to the control shaft 132 of the raising linkage. The lever pin 170 will be maintained in axial alignment with the axis of the solder applicator so long as the handles for the raising linkage and the nozzle cleaning linkage are operated conjointly. The other end of the lever is keyed to a horizontally extending torque rod 174 which passes through a hole in the left end cap 62 of the solder applicator and is pivotally received by a suitable bracket 176 secured to the nozzle barrel 60. An actuator 180 extends around the barrel and is welded to and moves with the torque rod 174 at one end and is joined at the other end via a link 184 to a nozzle bracket 182. When the nozzle orifice 70 is to be cleaned, the actuating handle 160 of the cleaning linkage is rotated clockwise while the actuating handle of the raising linkage is held in position. The vertical link 166 is accordingly lowered whereby the torque rod is rotated about its axis pulling the actuator in a counterclockwise direction opening the nozzle to the dotted position shown in Figure 4. With the orifice opened, debris will be washed from the orifice.

What is claimed is:

1. A machine for soldering a work product comprising
    means for conveying work product through the machine,
    applicator means for directing an extended liquid stream of solder against the conveyed work product,
    means for pivotally supporting said applicator means for rotation about a horizontal axis and for directing liquid to said applicator means,
    a manifold assembly for delivering liquid to said pivotally supporting means including
    a tubular manifold, and
    conduit means for delivering liquid from said tubular manifold to said applicator supporting means, and
    means for pivotally supporting said manifold assembly for rotation about an axis parallel to the axis of said applicator means, and
    means for rotating said applicator means about its axis including
    a bell crank,
    means for supporting said bell crank on said manifold assembly supporting means for rotation about the axis of said manifold assembly,
    a link member,
    means for pivotally connecting one end of said link member to said bell crank and the other end of said link to said applicator means with the points of interconnection defining with the axes of rotation of said applicator means and said tubular manifold a parallelogram so that rotation of said bell crank will rotate said applicator means, and
    means for rotating said bell crank.

2. A machine according to claim 1, further comprising means for rotatively displacing said manifold assembly.

3. A machine according to claim 1, wherein said means for pivotally supporting said tubular manifold comprises bearing means including
    a first bearing surface for rotatably supporting said tubular manifold, and a second bearing surface for rotatably supporting said bell crank.

4. A machine according to claim 1 wherein said applicator means includes an end plate and said means for pivotally supporting said applicator means includes an end plate, said end plates each including an axially extending through hole and said through holes being selectively located so as to be in alignment when said applicator is rotated to a selected orientation, and means for sealing said through hole in said applicator end plate when said through holes are not in alignment.

* * * * *